(12) United States Patent
Fujita et al.

(10) Patent No.: US 7,883,599 B2
(45) Date of Patent: Feb. 8, 2011

(54) DEVICE AND METHOD FOR JOINING CERAMICS STRUCTURAL BODY

(75) Inventors: Jun Fujita, Nagoya (JP); Takahisa Kaneko, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 622 days.

(21) Appl. No.: 11/808,232

(22) Filed: Jun. 7, 2007

(65) Prior Publication Data
US 2007/0235128 A1    Oct. 11, 2007

Related U.S. Application Data

(63) Continuation of application No. 10/500,038, filed as application No. PCT/JP02/10960 on Oct. 22, 2002, now abandoned.

(30) Foreign Application Priority Data

Jan. 24, 2002    (JP) .............................. 2002-015355

(51) Int. Cl.
*B29C 65/00*    (2006.01)
*C04B 33/34*    (2006.01)
*C04B 37/00*    (2006.01)
*B65C 9/25*    (2006.01)
*C09J 5/00*    (2006.01)
*B32B 37/00*    (2006.01)
*B32B 3/12*    (2006.01)

(52) U.S. Cl. .................... 156/285; 156/89.22; 156/296; 156/323; 156/382; 428/117

(58) Field of Classification Search ................... 156/86, 156/89.11, 89.22, 182, 242, 244.11, 244.13, 156/244.22, 244.26, 244.27, 285, 296, 323, 156/381, 382; 428/116, 117, 118
See application file for complete search history.

(56) References Cited

U.S. PATENT DOCUMENTS 3,661,644 A  *  5/1972  Arrance ...................... 429/140

(Continued)

FOREIGN PATENT DOCUMENTS

EP    1 072 878 A2  *  1/2001

(Continued)

*Primary Examiner*—Philip C Tucker
*Assistant Examiner*—Brian R Slawski
(74) *Attorney, Agent, or Firm*—Oliff & Berridge, PLC

(57) ABSTRACT

There is provided a device for bonding ceramic structural bodies. In the state in which a set of ceramic structural bodies provided with a bonding agent between bonding surfaces and provided with elastic sleeves disposed on a peripheral surface of the set of the structural bodies are placed in a tubular container with an elastic sheet disposed between the elastic sleeves and the tubular container, the device is able to charge a hydrostatic pressure medium between the tubular container and the elastic sheet to press and bond the structural bodies. By bonding the ceramic structural bodies with the device, it may provide accurate positioning of the bonding surfaces. It may also provide a uniform distance between bonded surfaces, and reduce the number of bonding operations, thereby affording an excellent working efficiency.

3 Claims, 2 Drawing Sheets

U.S. PATENT DOCUMENTS

| | | | |
|---|---|---|---|
| 4,749,421 A | | 6/1988 | Matsui et al. |
| 4,839,214 A | * | 6/1989 | Oda et al. .................... 428/116 |
| 5,084,329 A | | 1/1992 | Kato et al. |
| 5,370,760 A | | 12/1994 | Mori et al. |
| 5,507,896 A | * | 4/1996 | Yoshimura et al. ....... 156/89.12 |
| 5,772,946 A | | 6/1998 | Kaminaga et al. |
| 6,405,602 B1 | * | 6/2002 | Itou et al. ..................... 73/818 |
| 6,596,666 B1 | * | 7/2003 | Yamada ...................... 502/327 |

FOREIGN PATENT DOCUMENTS

| | | | |
|---|---|---|---|
| JP | A-4-249106 | | 9/1992 |
| JP | A-4-329104 | | 11/1992 |
| JP | 05084713 A | * | 4/1993 |
| JP | A-5-254947 | | 10/1993 |
| JP | A-5-293810 | | 11/1993 |
| JP | A-7-193163 | | 7/1995 |
| JP | A-10-197429 | | 7/1998 |
| PL | 157197 B1 | | 6/1990 |

* cited by examiner

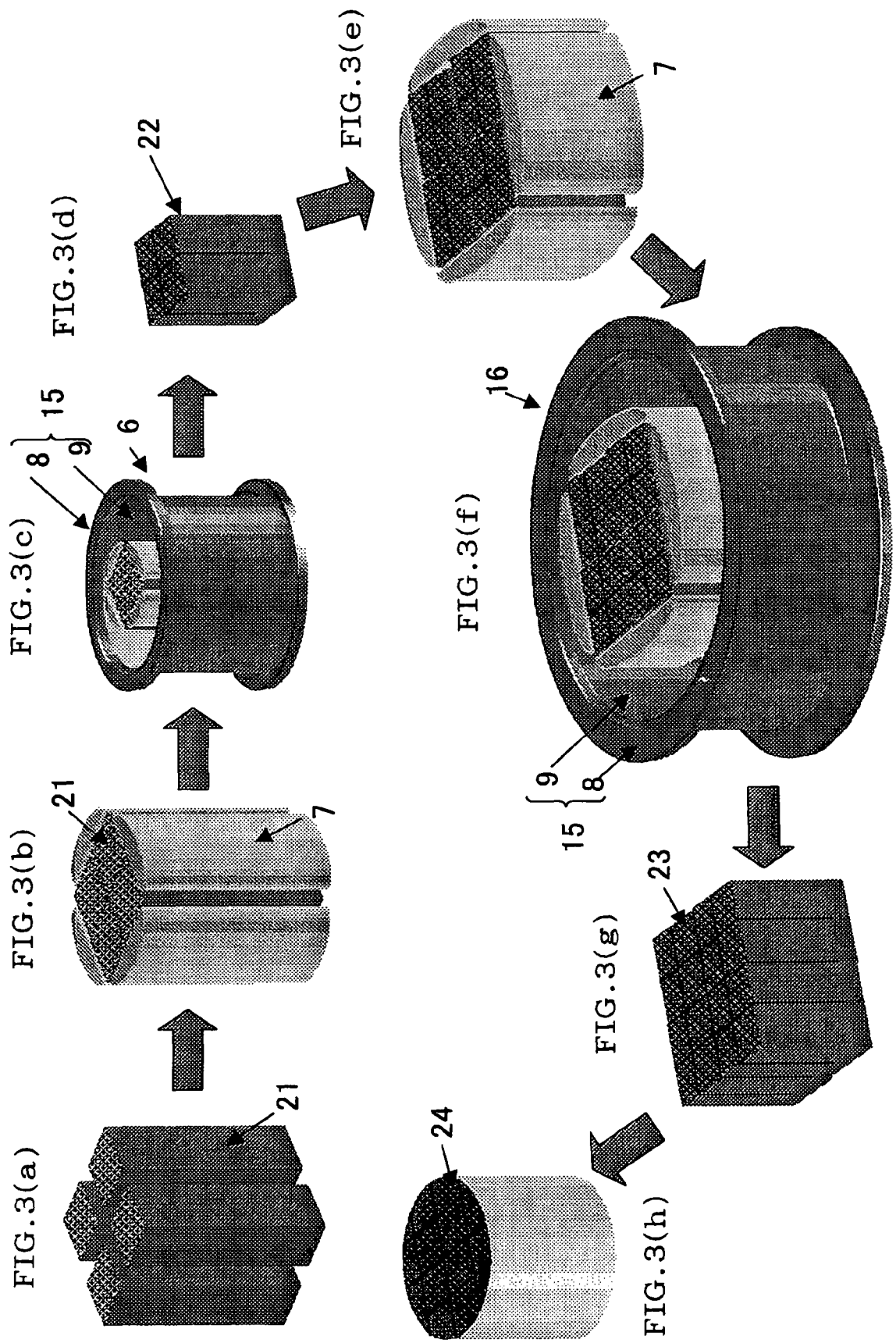

DEVICE AND METHOD FOR JOINING CERAMICS STRUCTURAL BODY

This is a Continuation of application Ser. No. 10/500,038 filed Jun. 23, 2004 now abandoned which in turn is a National Phase of PCT/JP02/109 60 filed Oct. 22, 2002.

TECHNICAL FIELD

The present invention relates to a device and method for bonding ceramic structural bodies, particularly, ceramic honeycomb structural bodies.

BACKGROUND ART

When producing a ceramic structural body with a large diameter, a method of first forming a number of ceramic structural bodies with small diameters and bonding them to form a ceramic structural body with a large diameter may be more preferable than directly producing a ceramic structural body with a large diameter. A honeycomb structural body made of ceramics used as a filter for particulate matter or as a catalyst carrier for an exhaust gas purification apparatus, for example, may be exposed to an extreme temperature change and the like according to the environment. Depending on the temperature characteristics of the materials forming the ceramic structural body, fabricating a structural body with a large diameter by bonding a number of structural bodies with small diameters may be more preferable than directly producing a structural body with a large diameter. In the case of a catalyst carrier for an exhaust gas purification apparatus, a wall in the structural body is made thinner in order to reduce the pressure loss, increase the effective catalytic area and the like. For manufacturing a ceramic structural body with such a thin wall, fabricating the structural body by bonding structural bodies with small diameters may be more preferable than directly forming the structural body with a large diameter in terms of an increase in the production yield.

Conventionally, in the process for producing a ceramic structural body with a large diameter by bonding a number of ceramic structural bodies with small diameters, the bonding work has been carried out by hand. Such manual work comprises, for example, bonding a ceramic structural body A with a ceramic structural body B to obtain a ceramic structural body C, bonding the ceramic structural body C with a next ceramic structural body D to obtain a ceramic structural body E, bonding the ceramic structural body E with a next ceramic structural body F to obtain a ceramic structural body G, and so forth. However, this method has the following problems.

(1) Increase in Working Efficiency is Limited.

When fabricating a ceramic structural body with a very large diameter, the number of ceramic structural bodies with small diameters to be bonded may unduly increase, resulting in an increase in the amount of work involved. Since the number of bonding operations required is equivalent to [(the number of required structural bodies with small diameters)—1], a great deal of manpower is required for obtaining one large diameter ceramic structural body, which increases the cost.

(2) Increase in product quality is limited.

When bonding two or more ceramic structural bodies, a bonding agent is applied to the surfaces of the ceramic structural bodies to be bonded and two ceramic structural bodies are pressed from the outside. In this instance, even if the bonding agent is uniformly applied to the surfaces to be bonded, the pressure may not be uniformly transmitted, giving rise to an uneven distance between bonded surfaces. Specifically, it is difficult to bond two ceramic structural bodies having completely parallel bonded surfaces. If a ceramic structural body is dried under such bonding conditions, cracks tends to occur between the bonded surfaces, resulting in low strength of the fabricated ceramic structural body.

When fabricating a ceramic structural body with a large diameter by bonding a number of ceramic structural bodies with small diameters, the ceramic structural bodies with small diameters having the same configuration and dimensions are used in many cases. It is difficult to accurately position the bonding surfaces of these ceramic structural bodies, even if these are placed on a flat plane. As a result, a fabricated ceramic structural body may have positional gaps in the vertical and horizontal directions. Such a ceramic structural body is undesirable, because it has a low open frontal area, which gives a low effective filter area and a great pressure loss. As a result, the filter performance is adversely affected.

DISCLOSURE OF THE INVENTION

The present invention has been completed in view of this situation and aims to provide a device and method for bonding ceramic structural bodies which may give accurate positioning of the bonding surfaces of small ceramic structural bodies, give a uniform distance between bonded surfaces, and reduce the number of bonding operations, thereby affording an excellent working efficiency when a large number of the small ceramic structural bodies are bonded to form a large ceramic structural body.

As a result of studies and researches on the conventional problems, it has found that the above object can be achieved by the way discussed below.

Specifically, the present invention provides a device for bonding ceramic structural bodies with a bonding agent, wherein in the state in which a set of ceramic structural bodies provided with the bonding agent between bonding surfaces of the structural bodies and provided with elastic sleeves disposed on a peripheral surface of the set of the structural bodies are placed in a tubular container with an elastic sheet disposed between the elastic sleeves and the tubular container, the device charges a hydrostatic pressure medium between the tubular container and the elastic sheet to press and bond the structural bodies.

In the device for bonding the ceramic structural bodies of the present invention, it is preferable that the elastic sleeves are made to contact with the ceramic structural bodies and made to be compressed by pressing at a high pressing speed, then the ceramic structural bodies are made to be pressed at a low pressing speed. It is preferable to use a bonding agent comprising a ceramic material as a main raw material. In addition, both the elastic sheet and the elastic sleeves are preferably made of a rubber material to bond vulnerable ceramic structural bodies without damage.

Ceramic structural bodies with a square cross-section are preferably bonded with the device of the present invention, because the bonding surfaces of the square ceramic structural bodies can be accurately positioned in any directions in a tubular container using elastic sleeves. In addition, the device of the present invention can be suitably used when the ceramic structural bodies are honeycomb structural bodies.

"bonding" in the present invention is not limited to the operation of pressing to expel the bonding agent present between the bonding surfaces, but also includes the operation of freely adjusting the distance between the bonding surfaces by controlling the amount and viscosity of the bonding agent present between the bonding surfaces, as well as by controlling the pressure applied via the elastic sheet and elastic sleeves.

The present invention also provides a method for bonding ceramic structural bodies, wherein the method comprises: a first step of forming a set of the ceramic structural bodies by applying a bonding agent between bonding surfaces of the structural bodies; a second step of disposing elastic sleeves on a peripheral surface of the set of the ceramic structural bodies; a third step of placing the ceramic structural bodies having the elastic sleeves in a tubular container with disposing an elastic sheet between the elastic sleeves and the tubular container; and a fourth step of charging a hydrostatic pressure medium between the tubular container and the elastic sheet.

BRIEF DESCRIPTION OF THE DRAWINGS

FIGS. 3(a) to 3(h) are perspective views schematically showing the steps in the method for bonding ceramic structural bodies of the present invention, wherein the top cylinder is omitted for convenience of description.

BEST MODE FOR CARING OUT THE INVENTION

The device for bonding ceramic structural bodies of the present invention is a device suitably used for two or more ceramic structural bodies with a bonding agent. The device for bonding ceramic structural bodies of the present invention is characterized in that, in the state in which a set of ceramic structural bodies provided with the bonding agent, preferably comprising a ceramic material as a main raw material, between bonding surfaces of the structural bodies and provided with elastic sleeves, preferably made of a rubber material, disposed on a peripheral surface of the set of the structural bodies are placed in a tubular container with an elastic sheet disposed between the elastic sleeves and the tubular container, the device charges a hydrostatic pressure medium between the tubular container and the elastic sheet to press and bond the structural bodies.

Figure 1:
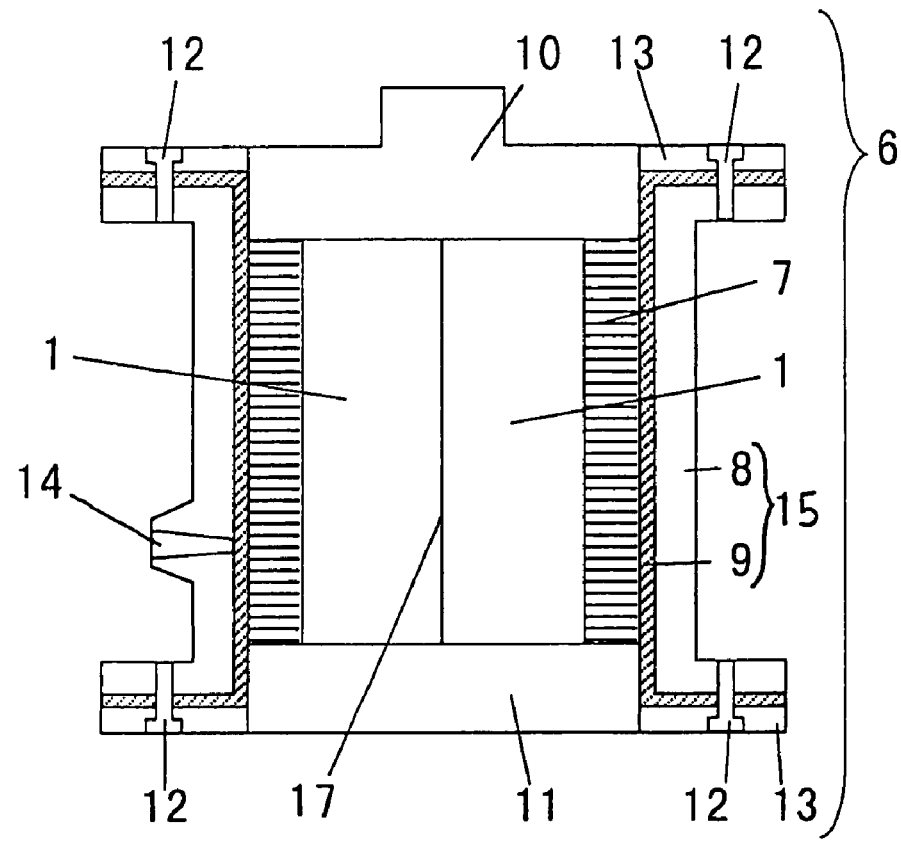
FIG. 1 is a cross-sectional view schematically showing one embodiment of the device for bonding ceramic structural bodies of the present invention.
Figure 2:
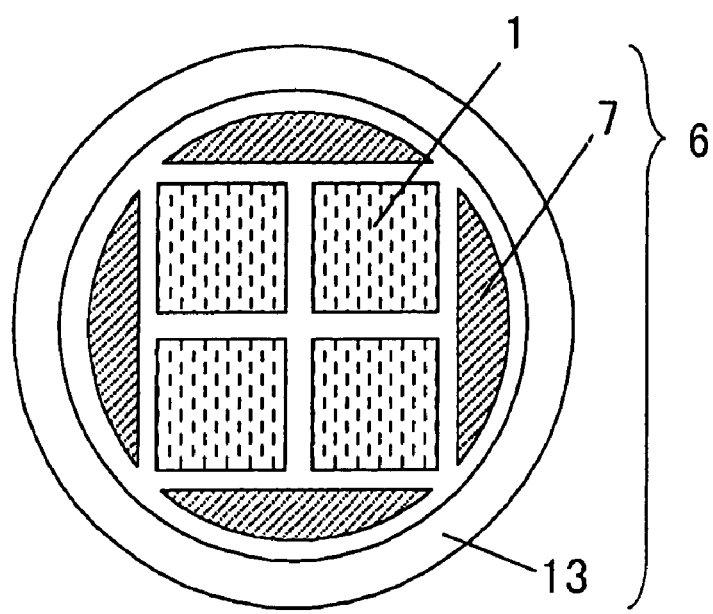
FIG. 2 is a sectional plan view schematically showing one embodiment of the device for bonding ceramic structural bodies of the present invention.

For example, as shown in FIG. 1, Using a device 6 for bonding ceramic structural bodies of the present invention, a set of ceramic structural bodies 1, formed by applying a bonding agent between bonding surfaces of the structural bodies and by getting together, with the peripheral surface of the set being surrounded by elastic sleeves 7, may be placed on a bottom cylinder 11 in the bonding container 15 having an elastic sheet 9 disposed on the inner wall of a tubular container 8. When the elastic sleeves 7 and the ceramic structural bodies 1 are placed in the bonding container 15 having the tubular container 8 and the elastic sheet 9, the ceramic structural bodies 1 are vertically secured by the bottom cylinder 11 and top cylinder 10. Next, a hydrostatic pressure medium is charged between the tubular container 8 and the elastic sheet 9 to press the ceramic structural bodies 1 from the peripheral side toward the inside via the elastic sleeves 7 so that the pressure distribution may be uniform over the whole peripheral surface.

Using the device 6 for bonding ceramic structural bodies of the present invention, the vertical position of the ceramic structural bodies 1 can be corrected by the bottom cylinder 11 and top cylinder 10 before the structural bodies are completely bonded by solidification of the bonding agent. In addition, since pressure is applied to the ceramic structural bodies 1 from the peripheral side toward the inside via the elastic sleeves 7, an occurrence of a positional gap in the horizontal direction between the bonding surfaces 17 is inhibited, whereby ceramic structural bodies with no positional gap in the vertical and horizontal directions between the bonding surfaces 17 may be obtained. Moreover, since a uniform pressure is applied to the entire peripheral surface, the pressure applied to the bonding surfaces of the ceramic structural bodies is uniform, whereby a uniform distance between the bonding surfaces is ensured and a number of ceramic structural bodies can be bonded with equal distances. Therefore, when the ceramic structural bodies bonded with a bonding agent are dried, generation of cracks on the bonded surfaces are inhibited, whereby the finished ceramic structural body has improved strength and an excellent dimensional accuracy.

In the device for bonding the cermic structural bodies of the present invention, for example, it is preferable to make the elastic sleeves 7 contact with the ceramic structural bodies 1 and compress the sleeves 7 at a pressing speed of about 50-100 kPa/sec, then apply pressure to the ceramic structural bodies 1 at a low pressing speed of about 10-50 kPa/sec. Ceramic structural bodies can be bonded efficiently in a short time without being damaged by changing the pressing speed stepwise to apply pressure.

After pressure is started to apply, until the elastic sleeves 7 are made to closely contact with the ceramic structural bodies 1 and compressed, no load is actually applied to the ceramic structural bodies 1 due to elasticity of the elastic sleeves 7. Therefore, there is no risk for the ceramic structural bodies 1 to be broken by impact, and it is possible to apply the pressure at a high pressing speed. On the other hand, after the elastic sleeves 7 are made to closely contact with the ceramic structural bodies 1 and compressed, load is actually started to apply to the ceramic structural bodies 1. Therefore, the elastic sleeves 7 must be compressed at a low pressing speed to prevent the ceramic structural bodies 1 from being broken by impact.

In the device for bonding ceramic structural bodies of the present invention, either one bonding container or two or more bonding containers may be provided to enclose the set of the ceramic structural bodies having the peripheral surface surrounded and supported by the elastic sleeves. When the device is provided with two or more bonding containers, such two or more bonding containers may have either the same diameter or different diameters. Although not shown in the drawings, if a device equipped with four bonding containers A, all having the same diameter, and another bonding container B having a diameter twice of the bonding container A is used, it is possible, for example, to bond four ceramic structural bodies X, all having the same configuration and the square cross-section, to obtain four ceramic structural bodies Y using the bonding containers A, and to bond the four ceramic structural bodies Y to obtain a ceramic structural body Z using the bonding container B. In this manner, it is possible to obtain the ceramic structural body Z composed of 16 ceramic structural bodies X bonded together using one device.

Although the device of the present invention can be used for bonding various ceramic structural bodies, it is particularly preferable to use the device to bond honeycomb ceramic structural bodies.

EXAMPLES

The present invention is described below in more detail by examples. However, the present invention is not limited the following examples.

As shown in FIGS. 3(a) to 3(h), using two devices 6 and 16 having different diameters, each having a bonding container 15 equipped with a tubular container 8 and a urethane rubber sheet 9, a honeycomb structural bonded body 24 was obtained by bonding 16 pieces of honeycomb segments 21 made of ceramics with the same configuration.

The honeycomb segment 21 has a cross-section of 35 mm×35 mm and length of 152 mm.

Each of the bonding containers 15 for the devices 6 and 16 shown in FIGS. 3(a) to 3(f) has a tubular container 8 made of stainless steel with an about 1 mm-thick elastic sheet 9 made of urethane rubber being disposed inside. The devices 6 and 16 are provided with an air release plug and connected with a pressurizing pipe from a pressure device(not shown in the drawing).

First, as shown in FIG. 3(a), four honeycomb segments 21 with a bonding agent applied to the bonding surfaces were combined. Then, polyurethane rubber elastic sleeves 7 with a maximum thickness of 15 mm were disposed around the peripheral surface of a set of the four honeycomb segments 21 as shown in FIG. 3(b).

An undercoat agent was previously sprayed over the bonding surfaces of the honeycomb segments 21, after that a bonding agent was applied to the bonding surfaces. The undercoat agent consisted of 35% by mass of SiC, 35% by mass of colloidal silica, and 30% by mass of water. The bonding agent consisted of 39% by mass of SiC, 30% by mass of aluminosilicate, 20% by mass of colloidal silica, 1% by mass of an inorganic plasticizer, and 10% by mass of water. Viscosity of the bonding agent may be about 200-500 p. The viscosity of the example was 400 p in this example.

Next, as shown in FIG. 3(c), the bonding container 15 of the device 6 was fixed on a table (not shown) and a bottom cylinder (not shown) was elevated from bottom surface to upper part of the bonding container 15. Then the set of the four honeycomb segments 21 surrounded by the polyurethane rubber sleeves 7 were placed on the bottom cylinder. Next, bottom cylinder was let down to lower part of the bonding container 15, and the set of the four honeycomb segments 21 surrounded by the polyurethane rubber sleeves 7 was placed in the bonding container 15.

Next, a top cylinder (not shown) was placed on the honeycomb segments 21. A pressure of about 0.1 MPa was applied to the bottom cylinder and the top cylinder to hold and fix the honeycomb segments 21 between the bottom cylinder and the top cylinder.

Then, a compression air valve (not shown) was opened to send compressed air at a pressure of 150 kPa between the tubular container 8 and the polyurethane rubber sheet 9, to make the polyurethane rubber sleeves 7 closely contact with the peripheral surface of the set of the four honeycomb segments 21 and to compress the set.

The four honeycomb segments 21 were pressed for 10 seconds at a pressure speed of 50 kPa/sec. When the pressure was applied in this manner, the polyurethane rubber sleeves 7 were made to closely contact with the peripheral surface of the set of the four honeycomb segments 21. The four honeycomb segments 21 were bonded without a positional gap in the bonding surfaces due to the pressure uniformly applied over the entire peripheral surface of the set of the honeycomb segments to produce a bonded body 22 as shown in FIG. 3(d). Four bonded bodies 22 were obtained by repeating the steps shown in FIGS. 3(a)-3(d) in the same manner as above.

Using a device 16 with a large diameter having the same specification as the device 6 except for the diameter, and the same undercoat agent and bonding agent, the steps as shown in FIGS. 3(e) and 3(f) were carried out in the same manner as in the steps as shown in FIGS. 3(b) and 3(c) to obtain a bonded body 23 having four bonded bodies 22 (or 16 honeycomb segments 21) shown in FIG. 3(g). A cylindrical bonded body 24 having a honeycomb structure was then obtained.

INDUSTRIAL APPLICABILITY

As described above, ceramic structural bodies can be bonded using the device of the present invention by a simple operation as compared with conventional technologies. A ceramic structural body (bonded body) with a large diameter and excellent quality can be obtained. When the pressure is applied stepwise, the bonding operation can be carried out efficiently in a short time.

The invention claimed is:

1. A method for bonding ceramic structural bodies, the method comprising:
   forming a set of ceramic structural bodies by applying a ceramic bonding agent between bonding surfaces of the structural bodies;
   disposing elastic sleeves on a peripheral surface of the set of ceramic structural bodies;
   placing the ceramic structural bodies with the elastic sleeves in a tubular container and disposing an elastic sheet between the elastic sleeves and the tubular container; and
   charging a hydrostatic pressure medium between the tubular container and the elastic sheet to apply pressure to the set of ceramic structural bodies, wherein charging the hydrostatic pressure medium includes:
      pressing the elastic sleeves into contact with the ceramic structural bodies by compressing the elastic sleeves at a pressing speed of about 50-100 kPa/sec, and
      applying pressure to the ceramic structural bodies in contact with the elastic sleeves at a pressing speed of about 10-50 kPa/sec,
   wherein the ceramic structural bodies have a honeycomb structure.

2. A method for bonding ceramic structural bodies according to claim 1, wherein the bonding agent contains a ceramic material as a main raw material.

3. A method for bonding ceramic structural bodies according to claim 1, wherein both the elastic sheet and the elastic sleeves are made of a rubber material.

* * * * *